United States Patent [19]
Watanabe et al.

[11] Patent Number: 5,099,938
[45] Date of Patent: Mar. 31, 1992

[54] REAR WHEEL STEERING APPARATUS FOR VEHICLES

[75] Inventors: Tsukasa Watanabe, Toyota; Akiya Taneda, Kariya, both of Japan

[73] Assignee: Aisin Seiki Kabushiki Kaisha, Kariya, Japan

[21] Appl. No.: 603,629

[22] Filed: Oct. 25, 1990

[30] Foreign Application Priority Data

Oct. 31, 1989 [JP] Japan .................................. 1-285387

[51] Int. Cl.$^5$ ............................................. B62D 5/12
[52] U.S. Cl. .................................... 180/140; 180/142; 280/91
[58] Field of Search ............... 180/140, 141, 142, 143, 180/79.1; 280/91

[56] References Cited

U.S. PATENT DOCUMENTS

| 4,572,316 | 2/1986 | Kanazawa et al. | 180/143 |
| 4,657,102 | 4/1987 | Kanazawa et al. | 280/91 |
| 4,811,805 | 3/1989 | Yoshida | 180/140 |
| 5,007,494 | 4/1991 | Ohmura et al. | 180/79.1 |
| 5,052,506 | 10/1991 | Nishimori et al. | 180/140 |

FOREIGN PATENT DOCUMENTS

| 62-15172 | 1/1987 | Japan . | |
| 0099465 | 4/1990 | Japan | 180/140 |

Primary Examiner—Charles A. Marmor
Assistant Examiner—Anne Marie Boehler
Attorney, Agent, or Firm—Burns, Doane, Swecker & Mathis

[57] ABSTRACT

The invention is directed to an apparatus for steering rear wheels of a vehicle. A vehicle speed sensor detects a speed of the vehicle, and a steering angle sensor detects a steering angle of front wheels of the vehicle and provides a first steering signal. A control device is provided for receiving the first steering signal and providing a second steering signal representing a desired steering angle of rear wheels of the vehicle which is determined in response to the first steering signal. A drive device is arranged to receive the second steering signal and steer the rear wheels to reach the desired steering angle. Then, a limit mechanism is provided for reducing the range of variation of steering angle of the rear wheels steered by the drive device to a predetermined range when the vehicle speed exceeds a predetermined speed, or the steering angle of the front wheels is less than a predetermined angle. Accordingly, when the vehicle is traveling at high speed, or when the vehicle turns with a large turning radius, the steering angle of the rear wheels is prevented from being unnecessarily varied.

6 Claims, 8 Drawing Sheets

Figure 8:
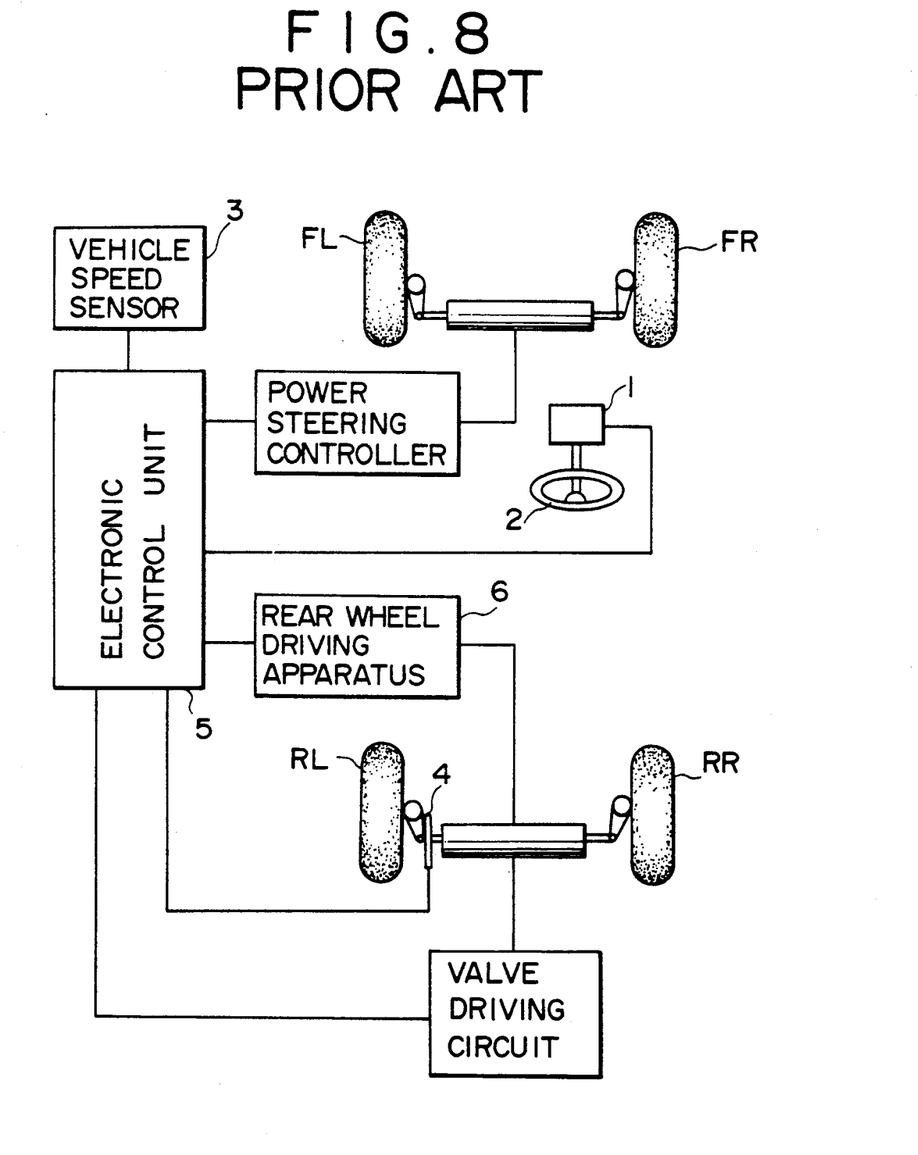

FIG. 8
PRIOR ART ns detects a steering angle of the right and left rear wheels RR and RL, and provides a signal representing the steering angle to the electronic control unit ECU. A vehicle speed sensor SP is disposed near the right rear wheel RR to detect a vehicle speed and provide an electric input signal indicative thereof to the electronic control unit ECU. The electronic control unit ECU controls the fluid pressure control unit 10 to adjust the directions of the right and left rear wheels RR and RL.

Figure 2:
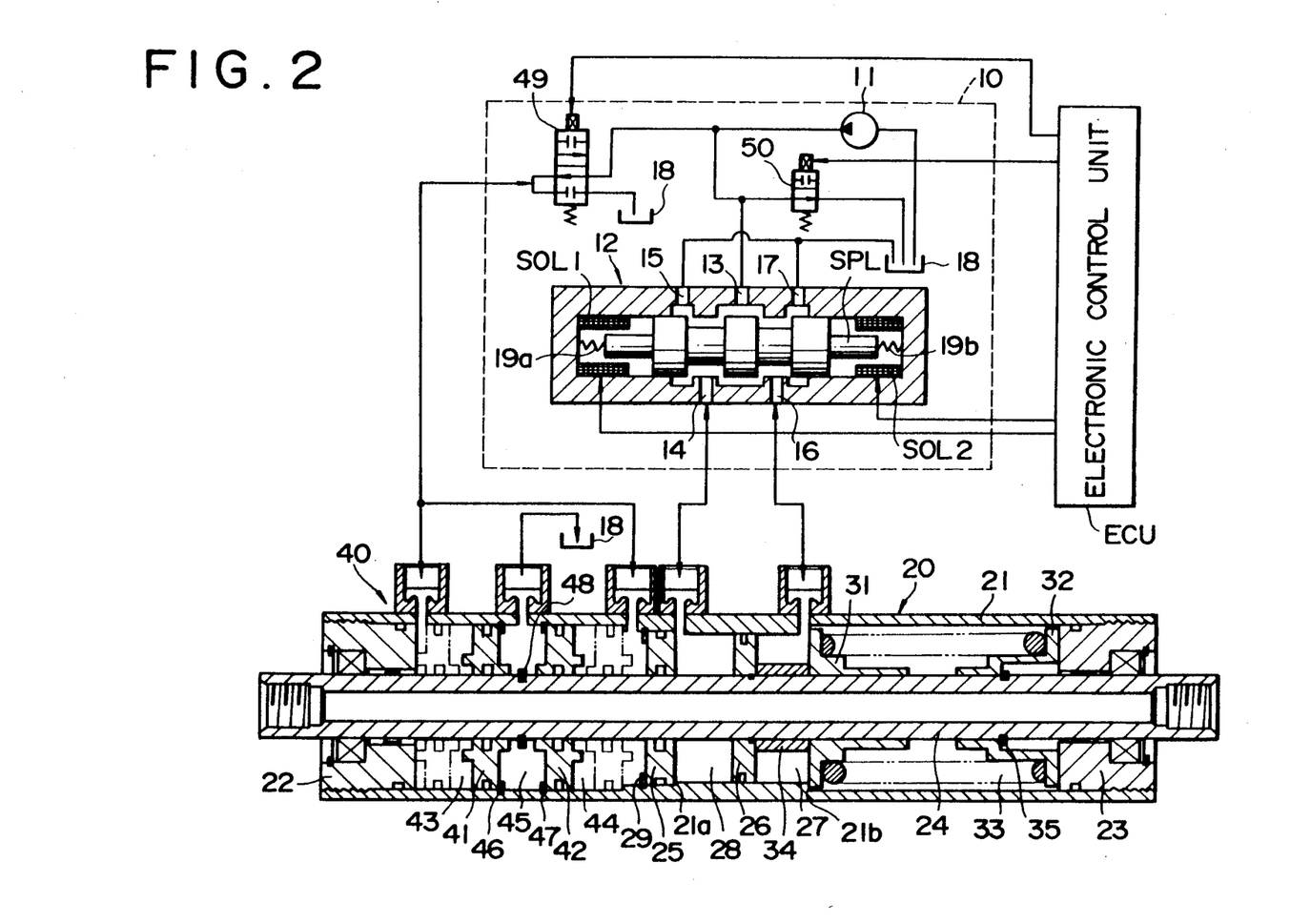

Hereinafter, the pressure fluid control unit 10 and the power cylinder 20 will be explained in detail with reference to FIG. 2. A fluid pump 11 sucks a working fluid from a drain 18 and supplies a pressurized fluid for changing the directions of the rear wheels RR, RL to an electromagnetic change-over valve 12. Thus, the fluid pump 11 corresponds to a power source according to the present invention. The fluid pump 11 is driven by an engine of an automobile (not shown), for example. The pressurized fluid generated by the fluid pump 11 is supplied to a common port 13 of the electromagnetic change-over valve 12.

Figure 1:
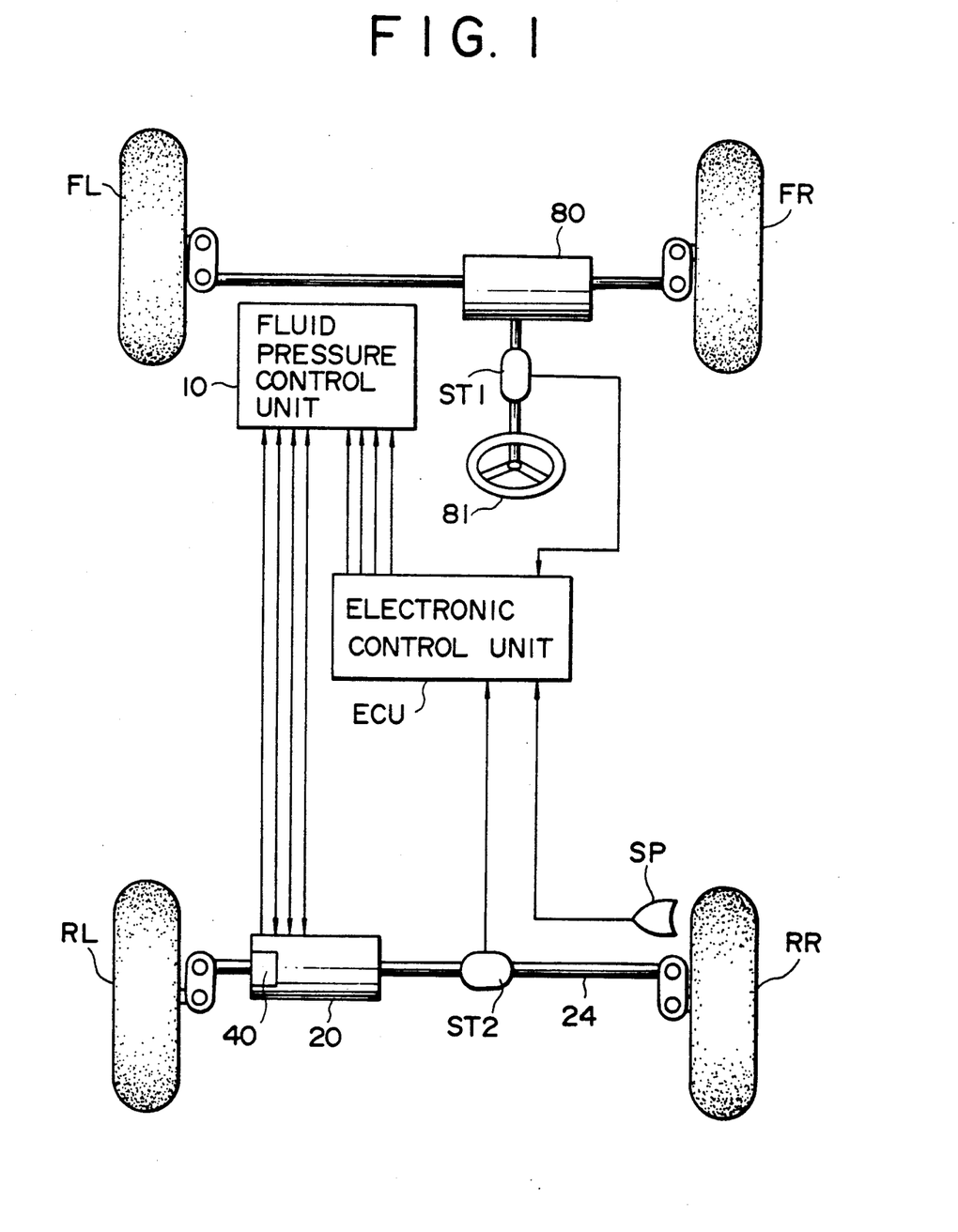

The electromagnetic change-over valve 12 is provided with a pair of solenoids SOL1, SOL2 and a spool valve SPL. When the electronic control unit ECU feeds an electric current to the solenoid SOL1, the spool valve SPL is attracted toward the solenoid SOL1 to move to the left in FIG. 1. Whereas, when the electronic control unit ECU feeds the electric current to the solenoid SOL2, the spool valve SPL is attracted toward the solenoid SOL2 to move to the right in FIG. 1. Further, when the electronic control unit ECU feeds the electric current to neither solenoid SOL1 nor the solenoid SOL2, the spool valve SPL is held in an approximately intermediate position between the solenoids SOL1 and SOL2, i.e., in a neutral position by biasing forces of springs 19a, 19b.

The power cylinder 20 is connected to the electromagnetic change-over valve 12. The power cylinder 20 is provided with a substantially cylindrical body 21, sealing members 22, 23 for sealing opposite ends of the body 21, and a steering rod 24 slidably mounted on the sealing members 22, 23. The cylindrical body 21 has a stepped bore defined therein, in which a partition wall 25 is disposed between the sealing members 22 and 23 and firmly fixed to the cylindrical body 21. The partition wall 25 is held between an O-ring 29 fixed to the body 21 and a stepped portion 21a formed in the body 21. Further, a sliding piston 26 is firmly fixed to the steering rod 24.

The steering rod 24 has a pair of retainers 31 and 32 slidably mounted thereon, between which a return spring 33 is disposed. A sleeve 34 is disposed between the retainer 31 and the sliding piston 26. The sleeve 34 is slidably mounted on the outer periphery of the steering rod 24. Thus, when the sliding piston 26 moves toward the sealing member 23, the sleeve 34 and the retainer 31 slide together with the sliding piston 26 as one body against the biasing force of the return spring 33, which is compressed in accordance with the movement of the sliding piston 26, since the retainer 32 immovably abuts on the sealing member 23. The retainer 32 is arranged to abut on an O-ring 35 which is fixed to the steering rod 24. Thus, when the sliding piston 26 moves toward the sealing member 22, the sleeve 34 slides together with the sliding piston 26 as one body, until the retainer 31 abuts on a stepped portion 21b formed in the body 21. The position of the stepped portion 21b is determined such that the rear wheels RR, RL are oriented in the straight forward direction when the retainer 31 abuts on the stepped portion 21b. Also, the position of the O-ring 35 is determined such that the rear wheels RR, RL are oriented in the straight forward direction when the retainer 32 abuts on the sealing member 23.

When the spool valve SPL moves toward the solenoid SOL1, a drain port 15 communicates with an output port 14, and the common port 13 communicates with an output port 16. Then, the pressurized working fluid received from the fluid pump 11 is supplied to a chamber 27 defined in the cylindrical body 21, and the working fluid in a chamber 28 defined also in the cylindrical body 21 is discharged to the drain 18, so that the sliding piston 26 moves toward the sealing member 22. On the other hand, when the spool valve SPL moves toward the solenoid SOL2, the common port 13 communicates with the output port 14, and a drain port 17 communicates with the output port 16. Then, the pressurized working fluid received from the fluid pump 11 is supplied to the chamber 28, and the working fluid in the chamber 27 is discharged to the drain 18, so that the sliding piston 26 moves toward the sealing member 23. When the spool valve SPL is in its neutral position, the common port 13 communicates with both output ports 14 and 16. Then, the pressurized working fluid received from the fluid pump 11 is supplied equally to the chambers 27 and 28, so that the sliding piston 26 moves toward the position where the rear wheels RR, RL are oriented in the straight forward direction, with a biasing force of the return spring 33 applied to the sliding piston 26. Accordingly, the electronic control unit ECU is arranged to change the direction of the rear wheels RR, RL by applying the electric currents to the solenoids SOL1 and SOL2.

The pressurized working fluid is supplied from the fluid pump 11 also to an electromagnetic control valve 49 which operates the fluid pressure lock mechanism 40 built in the power cylinder 20. The fluid pressure lock mechanism 40 is disposed between the partition wall 25 and the sealing member 22, and provided with a pair of sliding pistons 41 and 42 which define three chambers 43, 44 and 45 within the bore of the body 21, and which correspond to the free pistons according to the present invention. The sliding pistons 41, 42 are slidably mounted on the outer periphery of the steering rod 24. The sliding piston 41 is allowed to slide between the sealing member 22 and an O-ring 46 fixed to the cylindrical body 21, whereas the sliding piston 42 is allowed to slide between the partition wall 25 and an O-ring 47 fixed to the cylindrical body 21. Further, each of the sliding pistons 41, 42 has a sectional area larger than that of the sliding piston 26.

The electromagnetic control valve 49 is connected to the chambers 43, 44 and arranged to supply and discharge the working fluid in the chambers 43, 44. When the pressurized working fluid is supplied to the chambers 43, 44 through the electromagnetic control valve 49, the chambers 43, 44 are expanded. Therefore, the sliding piston 41 moves until it abuts on the O-ring 46, and the sliding piston 42 moves until it abuts on the O-ring 47.

An O-ring 48 is disposed between the sliding pistons 41 and 42, and fixed to the steering rod 24. When the steering rod 24 moves toward the sealing member 22, the O-ring 48 abuts on the sliding piston 41. Since the sliding piston 41 has the sectional area larger than that of the sliding piston 26, the steering rod 24 stops when the O-ring 48 abuts on the sliding piston 41 which is held to be positioned as shown in FIG. 2 when the pressurized working fluid is supplied to the chamber 43. Whereas, when the steering rod 24 moves toward the sealing member 23, the O-ring 48 abuts on the sliding piston 42. Since the sliding piston 42 has the sectional area larger than that of the sliding piston 26, the steering rod 24 stops when the O-ring 48 abuts on the sliding piston 42. Therefore, the movable range, i.e., the slidable range of the steering rod 24 is limited to a distance between the sliding pistons 41 and 42 positioned as shown in FIG. 2. Thus, the O-ring 48 constitutes an engaging member according to the present invention.

Accordingly, when the pressurized working fluid is supplied to the chambers 43, 44, and the sliding pistons 41, 42 move to abut on the O-rings 46, 47 respectively, the slidable range of the steering rod 24 becomes narrow. In the present embodiment, the operational range of both rear wheels RR and RL may be limited to a range within ±1 degree by supplying the pressurized working fluid to the chambers 43, 44.

When the chambers 43, 44 are communicated with the drain 18 through the electromagnetic valve 49, the sliding piston 41 or 42 moves in accordance with the movement of the steering rod 24 to extend the slidable range of the steering rod 24. The working fluid in the chamber 43 or 44 is discharged to the drain 18 in accordance with the movement of the sliding piston 41 or 42. In the present embodiment, the operational range of both rear wheels RR and RL may be extended to a range within ±4 degrees by communicating the chambers 43, 44 with the drain 18. The chamber 45 normally communicates with the drain 18 to receive the working fluid leaked out of gaps between the sliding pistons 41, 42 and the body 21, and gaps between the sliding pistons 41, 42 and the steering rod 24.

The pressurized working fluid is supplied from the fluid pump 11 also to an electromagnetic control valve 50, which is normally closed and opened only when any abnormality is detected by the electronic control unit ECU. When the electromagnetic control valve 50 is opened, the electromagnetic change-over valve 12 and the electromagnetic control valve 49 communicate with the drain 18. Consequently, the sliding piston 26 moves toward the position where the rear wheels RR, RL are oriented in the straight forward direction, with the biasing force of the return spring 33 applied to the sliding piston 26, so that the fluid pressure lock mechanism 40 is released.

Figure 3:
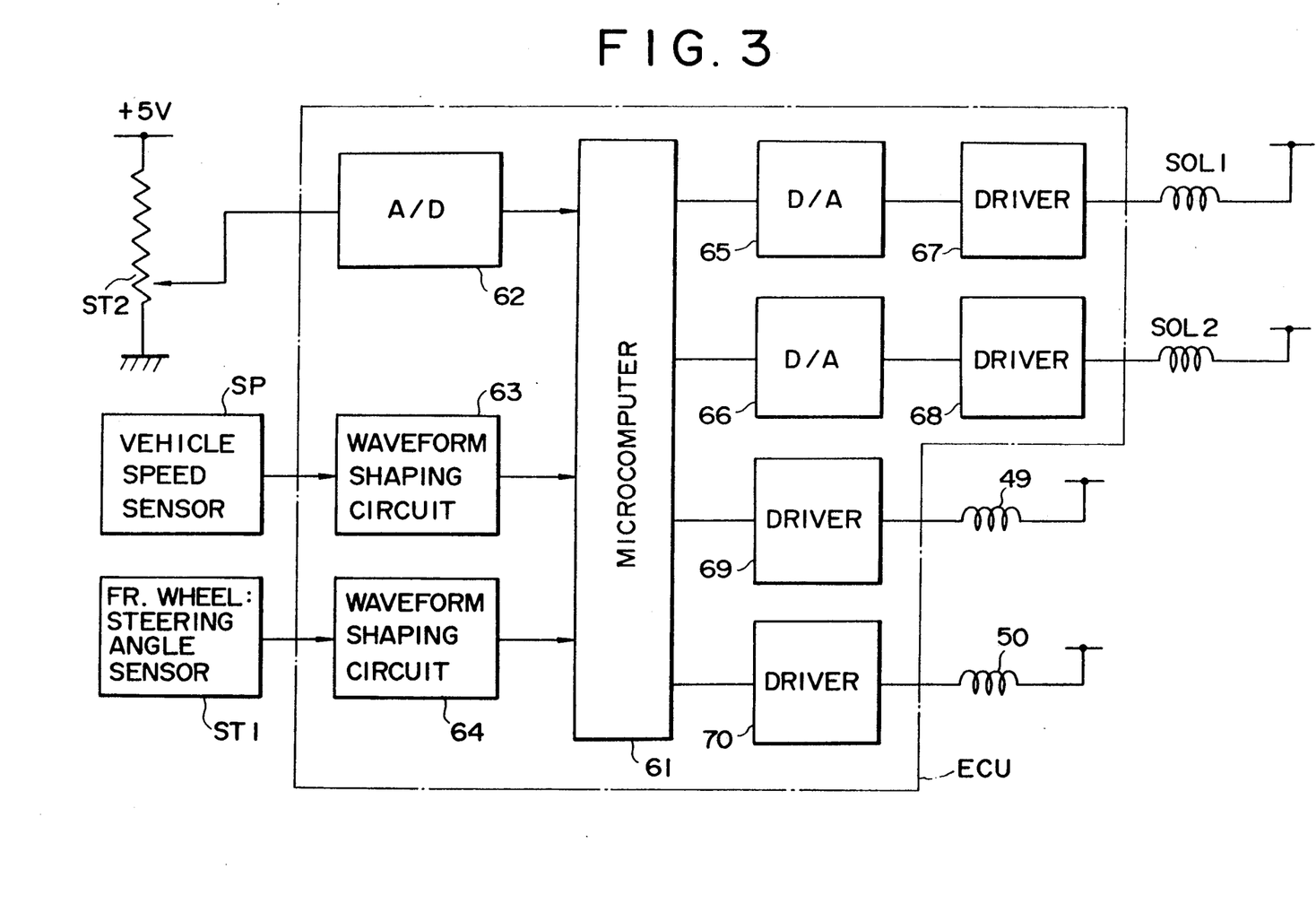

Next will be described the electronic control unit ECU with reference to FIG. 3. The electric signal fed from the steering angle sensor ST2 disposed at the rear wheels' side is converted into a digital signal by an A/D converting circuit 62 and then inputted to a microcomputer 61. The electric signal fed from the vehicle speed sensor SP is inputted to the microcomputer 61 through a waveform shaping circuit 63. The electric signal fed from the steering angle sensor ST1 disposed at the front wheels' side is inputted to the microcomputer 61 through a waveform shaping circuit 64. The microcomputer 61 is arranged to drive the solenoid SOL1 through a D/A converting circuit 65 and a driver 67, and to drive the solenoid SOL2 through a D/A converting circuit 66 and a driver 68. Since the D/A converting circuits 65 and 66 are connected to the microcomputer 61, the electric currents fed to the solenoids SOL1 and SOL2 may be analogously adjusted. The microcomputer 61 drives the electromagnetic control valve 49 through a driver 69. Also, the microcomputer 61 drives the electromagnetic control valve 50 through a driver 70.

Figure 4:
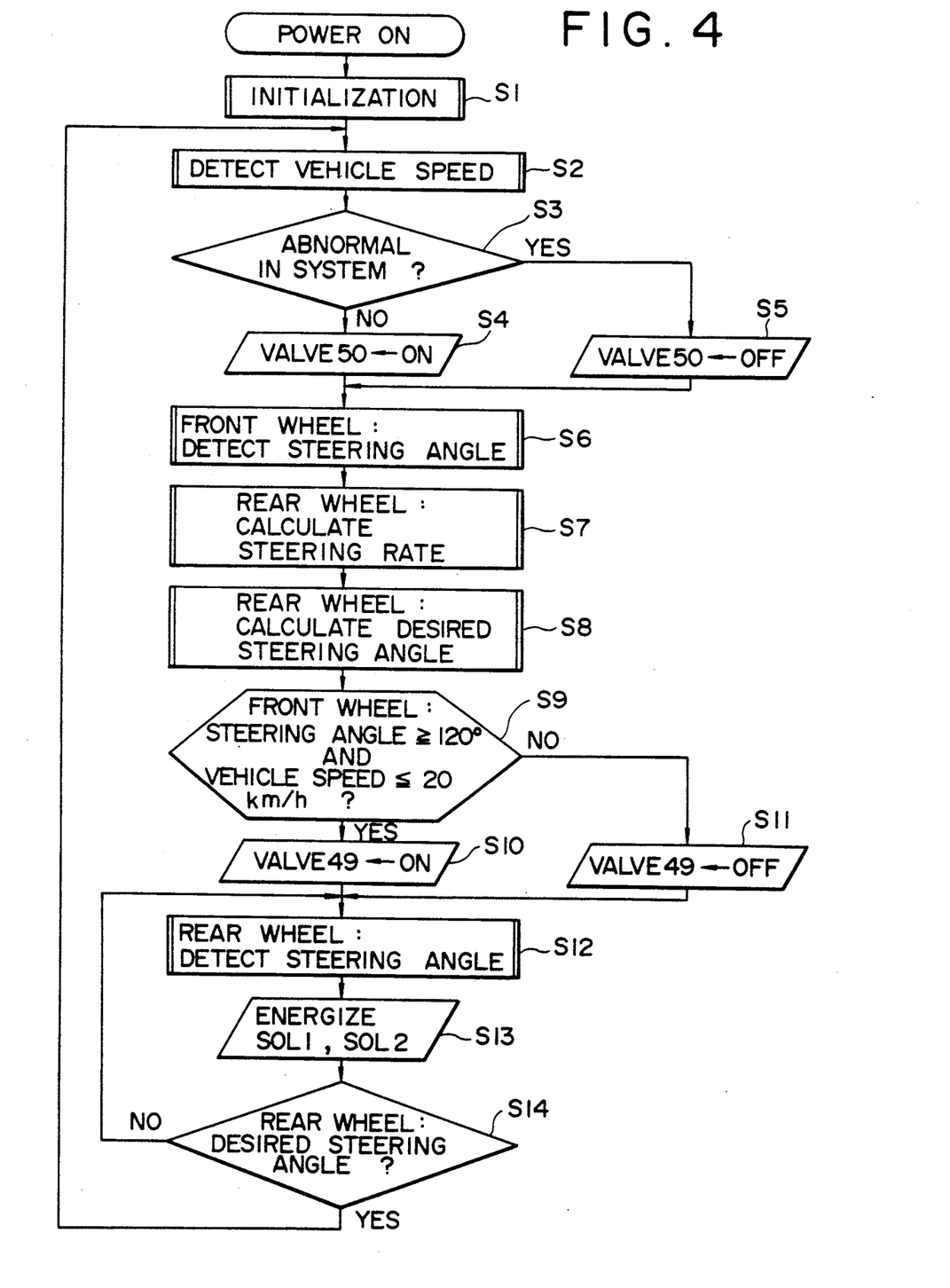

A program routine executed by the microcomputer 61 will now be described with reference to FIG. 4. The program routine provides for initialization of the apparatus at Step S1, where a memory is cleared, a routine for interruption is set, timers are set and the like is executed for the microcomputer 61 itself, and where initial values for various registers and flags are stored in the memory. Then, the program proceeds to Step S2 where a vehicle speed V at the present time is detected. In practice, the number of pulses generated by the vehicle speed sensor SP is counted in a cycle of timer-interruption generated at intervals of a predetermined period of time, in the routine for interruption (not shown) executed every predetermined period of time, and then the number of pulses is converted into the vehicle speed.

Next, the program proceeds to Step S3 where it determines if any abnormality occurs in the system, like a case where the steering angle sensor ST1 or ST2 provides any abnormal signal, for example. If the result is nagative (NO), i.e., no abnormality occurs in the system, the program proceeds to Step S4 where the electromagnetic control valve 50 is closed. Whereas, if the result is affirmative (YES), i.e., the abnormality occurs in the system, the program proceeds to Step S5 where the electromagnetic control valve 50 is opened.

The program then proceeds to Step S6 where the steering angle of the right and left front wheels FR and FL is detected on the basis of the signal fed from the steering angle sensor ST1. Then, at Step S7, the steering rate of the rear wheels RR, RL is calculated on the basis of a predetermined equation as follows:

$$k = \frac{-b \cdot H \cdot Cf \cdot Cr + a \cdot M \cdot Cf \cdot V^2}{a \cdot H \cdot Cf \cdot Cr + b \cdot M \cdot Cr \cdot V^2}$$

where k corresponds to the steering rate of the rear wheels, H corresponds to the wheel base of the vehicle, M corresponds to the mass of the vehicle, V corresponds to the speed of the vehicle (vehicle speed), Cf corresponds to the cornering power of the front wheels, Cr corresponds to the cornering power of the rear wheels, a corresponds to the distance between the centers of gravity of the front wheels, and b corresponds to the distance between the centers of gravity of the rear wheels.

Figure 5:
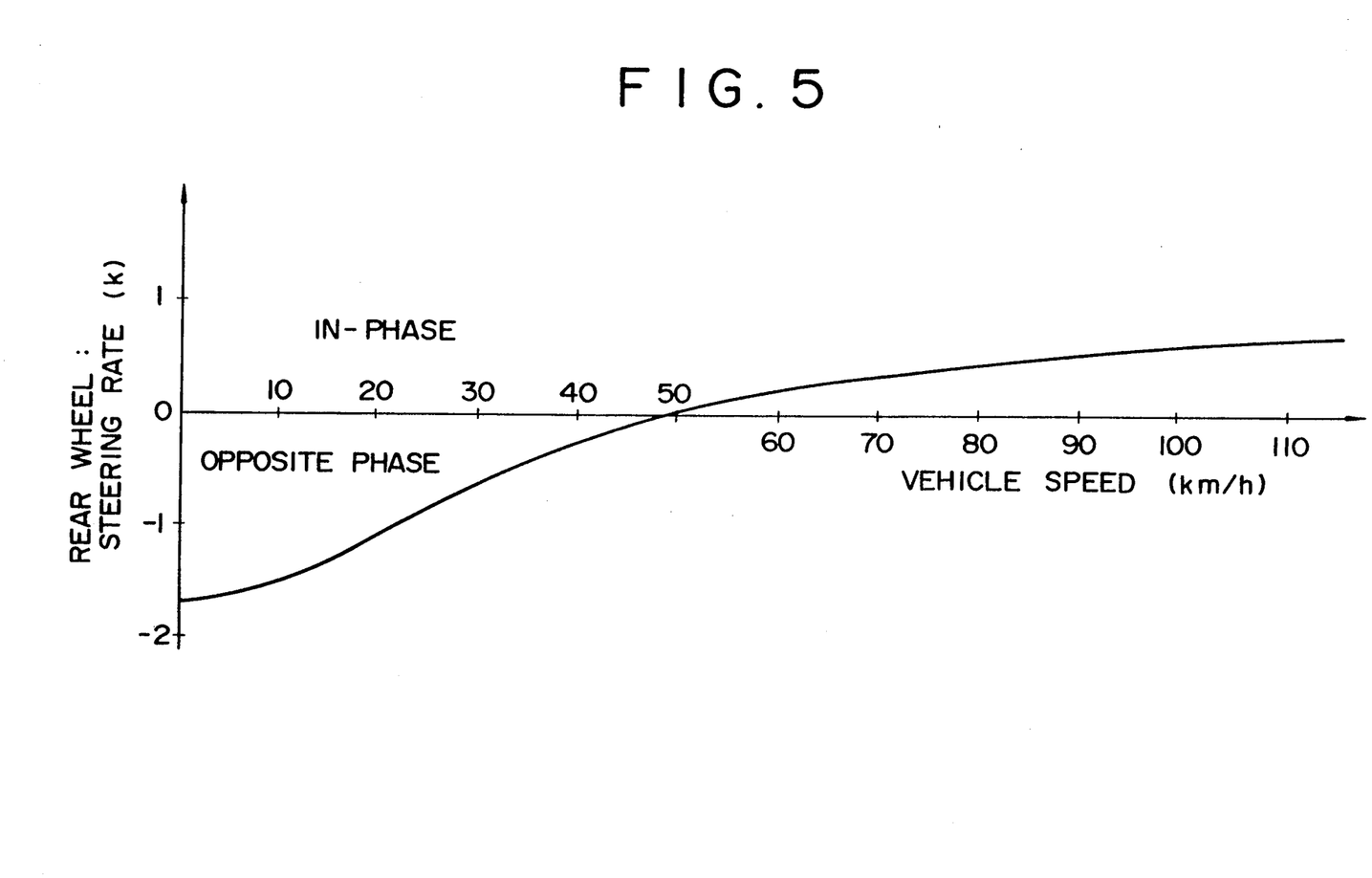

In FIG. 5 showing the steering rate of the rear wheels determined on the basis of the characteristics of a certain experimental vehicle, when the vehicle is travelling at high speed, the steering rate of the rear wheels is set to the in-phase side, whereas, when the vehicle is travelling at low speed, the steering rate of the rear wheels is set to the opposite phase side. Since a way of obtaining the steering rate of the rear wheels has been already disclosed in references of automobile technique or the like as is well known per se, the detailed description thereof will be omitted.

Figure 6:
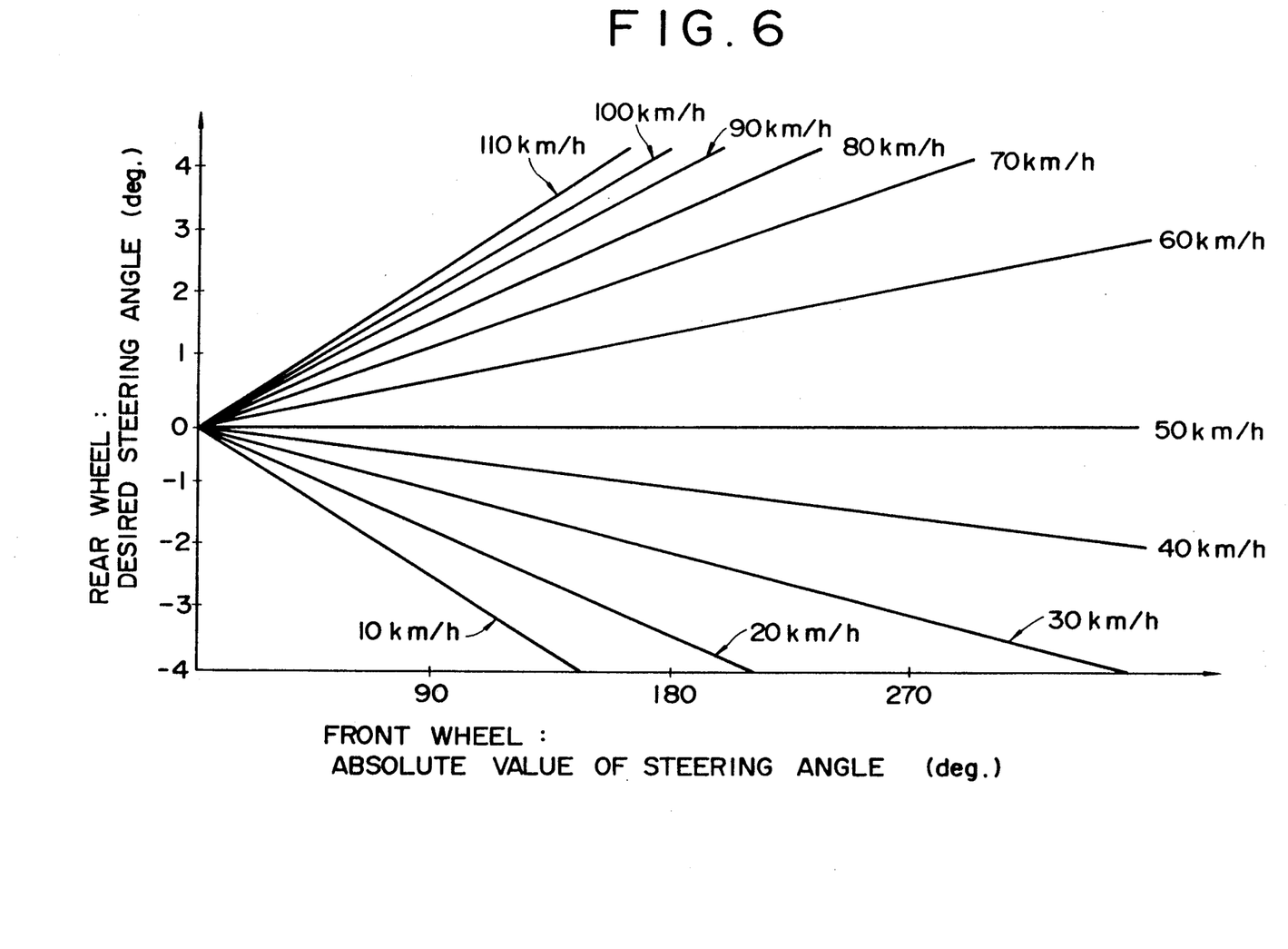

Then, the program proceeds to Step S8 where the desired steering angle of the rear wheels is calculated on the basis of a predetermined equation as follows:

$$\theta = k \cdot (S/N)$$

where k corresponds to the steering rate of the rear wheels, $\theta$ corresponds to the desired steering angle of the rear wheels, S corresponds to the steering angle of the front wheels, and N corresponds to the overall steering ratio. In FIG. 6 showing the desired steering angle of the rear wheels determined on the basis of the characteristics of a certain experimental vehicle, when the vehicle is travelling at high speed, the desired steering angle of the rear wheels is set to the in-phase side. Whereas, when the vehicle is travelling at low speed, the desired steering angle of the rear wheels is set to the opposite phase side. Besides, when an absolute value of the steering angle of the right and left front wheels FR and FL increases, the absolute value of the desired steering angle increases. Since a way of obtaining the desired steering angle of the rear wheels is also well known, the detailed description thereof will be omitted.

Figure 7:
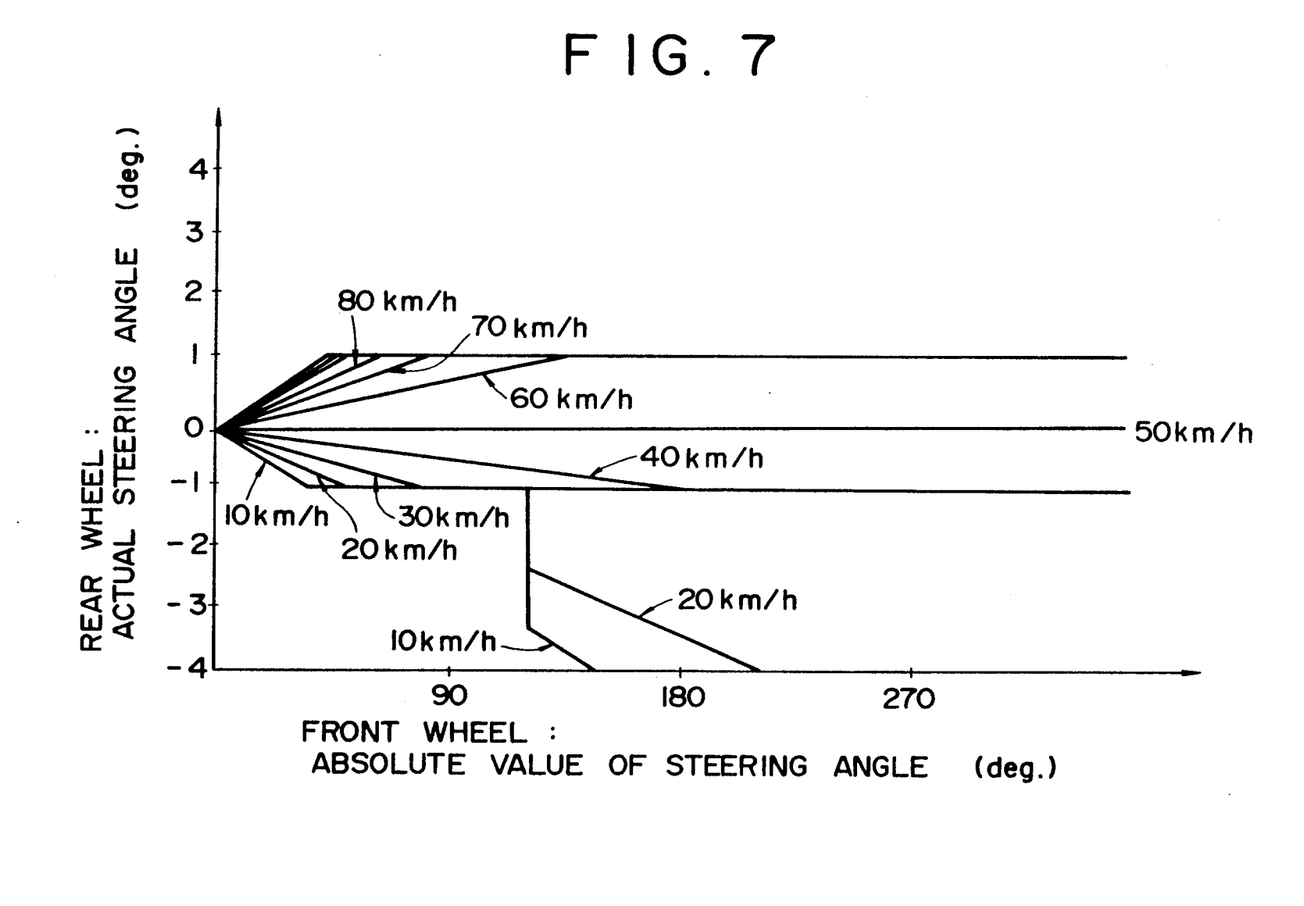

The program then proceeds to Step S9 where it determines if the absolute value of the steering angle of the front wheels obtained at Step S6 is equal to or more than 120 degrees, and the vehicle speed is equal to or less than 20 km/h. If the result is affirmative (YES), i.e., when the absolute value of the steering angle of the front wheels is equal to or more than 120 degrees, and the vehicle speed is equal to or less than 20 km/h, the program proceeds to Step S10 where the working fluid is discharged from the fluid pressure lock mechanism 40 to the drain 18 through the electromagnetic control valve 49. Consequently, the fluid pressure lock mechanism 40 is released, and the steering angle of the rear road wheels RR, RL is controlled within the operational range of ±4 degrees, namely, within the operational range determined depending on a capacity of the power cylinder 20. Whereas, if the result is negative (NO), i.e., when the absolute value of the steering angle of the front wheels is less than 120 degrees, or the vehicle speed exceeds 20 km/h, the program proceeds to Step S11 where the pressurized working fluid is supplied from the fluid pump 11 to the fluid pressure lock mechanism 40 through the electromagnetic control valve 49. Consequently, the fluid pressure lock mechanism 40 is operated, and the steering angle of the rear wheels RR, RL is limited within ±1 degree, namely, the operational range limited by the fluid pressure lock mechanism 40. Thus, the direction of the rear wheels RR, RL, i.e., the actual steering angle thereof is controlled as shown in FIG. 7, in practice.

Further, the program proceeds to Step S12 where the steering angle of the right and left rear wheels RR, RL is detected on the basis of the signal from the steering angle sensor ST2. Then, at Step S13, the electric current is fed to the solenoid SOL1 or SOL2 of the electromagnetic change-over valve 12 on the basis of the desired steering angle of the rear wheels calculated at Step S8.

Thereafter, the program proceeds to Step S14 where the desired steering angle of the rear wheels obtained at Step S8 is compared with the steering angle of the rear wheels obtained at Step S12. If there is a difference between the desired steering angle and the detected steering angle of the rear wheels, i.e., if the result is negative (NO), Steps S12 and S13 are repeatedly executed to continuously apply the electric current to the solenoid SOL1 or SOL2 until the steering angle of the rear wheels is made equal to the desired steering angle of the rear wheels. If the steering angle of the rear wheels is equalized to the desired steering angle of the rear wheels, i.e., if the result is affirmative (YES), the program returns to Step S2 to repeatedly execute the routine.

According to the present embodiment, the electric current is applied to the electromagnetic control valve 49 so that the fluid pressure lock mechanism 40 is released, only when the vehicle is traveling at low speed, and besides, the steering angle of the right and left front wheels FR, FL is large, through Steps S9 and S10. Accordingly, the minimum turning radius of the vehicle may be reduced so long as the vehicle is traveling at low speed. Whereas, when the vehicle is traveling at high speed so that the steering angle of the right and left rear wheels RR, RL does not need to be largely changed, the fluid pressure lock mechanism 40 operates not to unnecessarily largely change the direction of the rear wheels RR, RL. Accordingly, when the vehicle is traveling at high speed, or when the vehicle turns with a large turning radius, the direction of the rear wheels RR, RL may be prevented from being unnecessarily changed. Thus, the turning performance of the vehicle is stabilized in the region where the rear wheels do not need to be steered.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An apparatus for steering rear wheels of a vehicle, comprising:
   a vehicle speed sensor for detecting a speed of said vehicle and providing a signal representing said vehicle speed;
   a steering angle sensor for detecting a steering angle of front wheels of said vehicle and providing a first steering signal representing said steering angle;
   control means for receiving said first steering signal and providing a second steering signal representing a desired steering angle of rear wheels of said vehicle determined in response to said first steering signal;
   drive means for receiving said second steering signal and steering said rear wheels to reach said desired steering angle; and
   limit means for receiving said signal representing said vehicle speed and reducing the range of variation of steering angle of said rear wheels steered by said drive means to a predetermined range when said vehicle speed exceeds a predetermined speed;
   said limit means receiving said first steering signal from said steering angle sensor, and wherein said limit means reduces the range of variation of steering angle of said rear wheels to said predetermined range when said steering angle of said front wheels is less than a predetermined steering angle;
   said drive means comprising a power source for producing a pressurized fluid, a power cylinder for changing the direction of said rear wheels, said power cylinder including a cylindrical body having a bore defined therein, a rod coaxially disposed in said bore and connected to said rear wheels, and a piston fixedly mounted on said rod and axially slidably disposed within said bore, said piston defining at one end thereof a first chamber within said bore and a second chamber at the other end of said piston within said bore, valve means selectively positionable in a first operating position for supplying said pressurized fluid to said first chamber and draining said second chamber, a second operating position for supplying said pressurized fluid to said second chamber and draining said first chamber, and a neutral position for supplying said pressurized fluid equally to said first and second chambers, and biasing means for biasing said rod against the movement thereof on the longitudinal axis thereof, and holding said rod at a position thereof where said rear wheels are oriented in the straight forward direction when said valve means is placed in said neutral position;

said limit means further comprising two free pistons slidably mounted on said rod and axially slidably disposed within said bore, said free pistons defining thereby three chambers within said bore, a first of said three chambers between said free pistons being drained, a control valve selectively placed in: (i) a narrow range position for supplying said pressurized fluid from said power source to second and third chambers of said three chambers to thereby position said free pistons close to each other with a first predetermined distance therebetween and (ii) a wide range position for draining said second and third chambers to thereby position said free pistons remote from each other with a second predetermined distance therebetween, and an engaging member fixedly mounted on said rod and disposed between said free pistons for engaging with either of said free pistons when said rod moves relative to said free positions.

2. An apparatus for steering rear wheels of a vehicle as set forth in claim 1, wherein said bore of said cylindrical body is formed in a stepped bore having a large-diameter bore and a small-diameter bore, and said cylindrical body has a partition wall disposed therein between said large-diameter bore and small-diameter bore, and wherein said two free pistons are slidably disposed in said large-diameter bore and said piston fixedly mounted on said rod is slidably disposed in said small-diameter bore, whereby said rod is prevented from moving against one of said free pistons applied thereto with said pressurized fluid when said engaging member is engaged with said one of said free pistons.

3. An apparatus for steering rear wheels of a vehicle as set forth in claim 2, wherein said cylindrical body has a pair of O-rings mounted on an inner surface thereof away from each other, and said free pistons are disposed engageable with said O-rings to retain said first predetermined distance.

4. An apparatus for steering rear wheels of a vehicle as set forth in claim 2, wherein said engaging member is an O-ring fixedly mounted on said rod between said free pistons.

5. An apparatus for steering rear wheels of a vehicle as set forth in claim 2, wherein said biasing means includes a pair of retainers slidably mounted on said rod and a spring disposed therebetween for expanding the distance between said retainers, opposite ends of said retainers being blocked, and one of said retainers being engageable with said rod to move together therewith in one direction.

6. An apparatus for steering rear wheels of a vehicle as set forth in claim 1, further comprising an auxiliary valve means for normally allowing the communication of said power cylinder and said control valve with said power source and draining said power cylinder and said control valve when said auxiliary valve means is operated.

* * * * *